C. ROBERTS.
Wheel Cultivator.

No. 37,010.

Patented Nov. 25, 1862.

Witnesses:
J Snowden Bell
David Dick

Inventor:
Cyrus Roberts
by his Attorney
Wm D Baldwin

UNITED STATES PATENT OFFICE.

CYRUS ROBERTS, OF THREE RIVERS, MICHIGAN.

IMPROVEMENT IN CULTIVATORS.

Specification forming part of Letters Patent No. 37,010, dated November 25, 1862.

*To all whom it may concern:*

Be it known that I, CYRUS ROBERTS, of Three Rivers, in the county of St. Joseph and State of Michigan, have invented certain new and useful Improvements in Cultivators, of which the following is a full, clear, and exact description, reference being had to the accompanying drawings, which make part of this specification, and in which—

Figure 1:
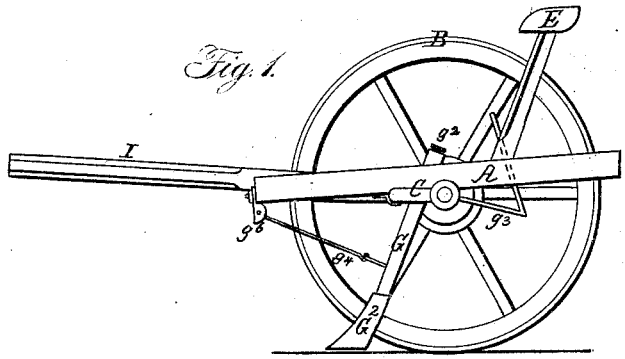
Figure 2:
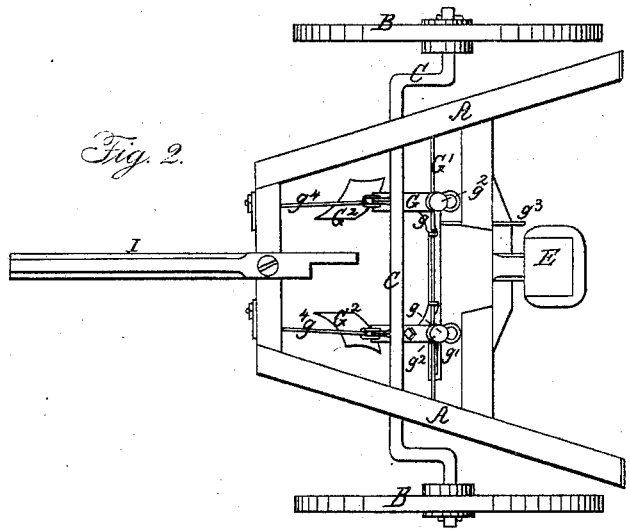
Figure 3:
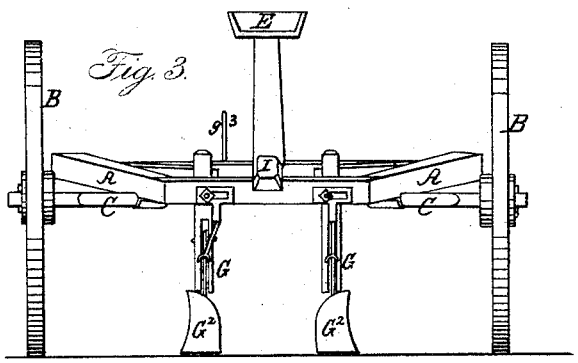

Figure 1 represents a view in elevation of one side of a cultivator embracing my improvements with the near wheel removed in order to show the parts more clearly. Fig. 2 represents a plan or top view of the same with the wheel in place, and Fig. 3 a view in elevation of the same as seen from the front.

It is one of the objects of my invention to provide means whereby crops may be cultivated with equal facility and success whether the rows be irregular or not; and to this end the improvements claimed under this patent consist, first, in mounting the feet to which the teeth are attached in a frame having a lateral sliding movement, in combination with stay-chains attached to a fixed point on the main frame of the machine, substantially in the manner described, whereby the feet are always kept parallel to the same plane without regard to their lateral play; secondly, in combining a slide-rod, a sliding frame, and a lever in the manner hereinafter described, whereby I am enabled to cultivate irregular rows with facility.

The accompanying drawings represent a convenient arrangement of parts for carrying out the objects of my invention.

The frame A is shown as supported upon two wheels, B, mounted on a crank-axle, C. In this instance the legs G are shown as secured on a bar or frame, $g$. They can be adjusted to any required distance apart by means of a slot and set-screw, $g'$. They may, however, likewise be adjusted and held at any distance apart desired by means of set-screws $g^2$ in the ends of the legs. (See Fig. 1.) The frame $g$ is capable of sliding freely on a rod or bar attached to the frame. In this instance the frame is shown as sliding on the rod G', which is back of the crank-axle; but in a machine in which no driver's seat is used the frame might slide on a rod in front of the axle, or even upon the axle itself.

A lever, $g^3$, is secured to the frame $g$ and extends backward to a point where it can readily be reached by the foot of the driver when riding upon the machine, or by his hand when walking. By thrusting this lever from side to side the frame is slidden laterally, as occasion requires, and the position of the feet G varied with respect to the row which they are cultivating, which is a great advantage where the planting is irregularly done.

In order to resist the strains to which they are subjected when in operation, the lower parts of the legs are sustained by stay rods or chains $g^4$, one end of which is attached to the leg by a swiveling joint, while the other is secured to an adjustable or swiveling bracket, $g^6$, on the frame A by means of a wooden pin. When an obstacle is encountered the pin breaks and permits the tooth to turn on its pivot, and thus escape damage. As a consequence of the arrangement above described the legs G always traverse in a path parallel to the plane they occupy, and consequently do not vary their angle relative to the frame; or, in other words, the feet are always kept parallel to the line of draft or the path of the machine.

It is deemed unnecessary here to describe in detail the construction and operation of the other portions of the machine, as they form no part of the subject-matter herein described. They are, moreover, fully described in another application for Letters Patent filed simultaneously with this and marked A.

What I claim under this patent as my invention is—

1. Mounting the feet in a frame having a lateral sliding movement, substantially as described, in combination with stay-chains attached at one end to the feet and at the other to a fixed point on the main frame, as set forth, for the purpose of keeping the feet always in the same plane relative to the frame or to the path of the machine, notwithstanding said lateral movements.

2. The combination of the rod G', sliding frame $g$, and lever $g^3$, when arranged and operating substantially as and for the purpose described.

In testimony whereof I have hereunto subscribed my name.

CYRUS ROBERTS.

Witnesses:
R. S. MORRISON,
WM. F. ARNOLD.